June 28, 1960 C. W. HOLMQUIST 2,942,505
HORIZONTALLY MOVABLE FEED TABLE
Filed Dec. 23, 1953 11 Sheets-Sheet 1
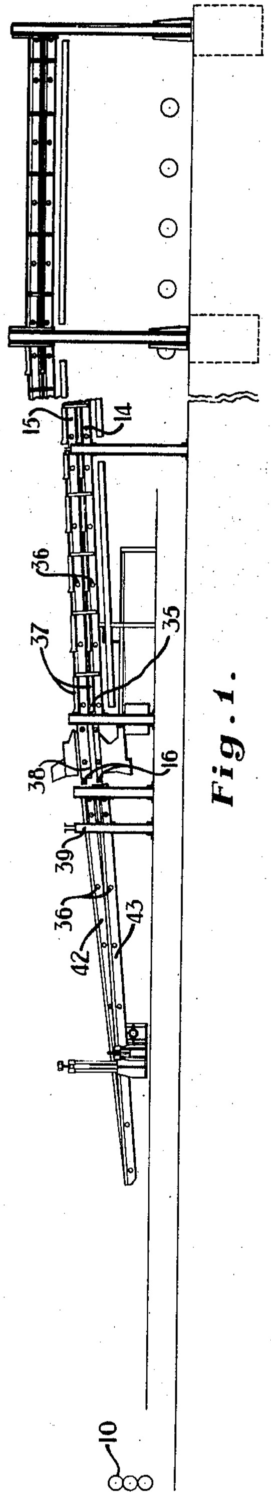
Fig. 1.
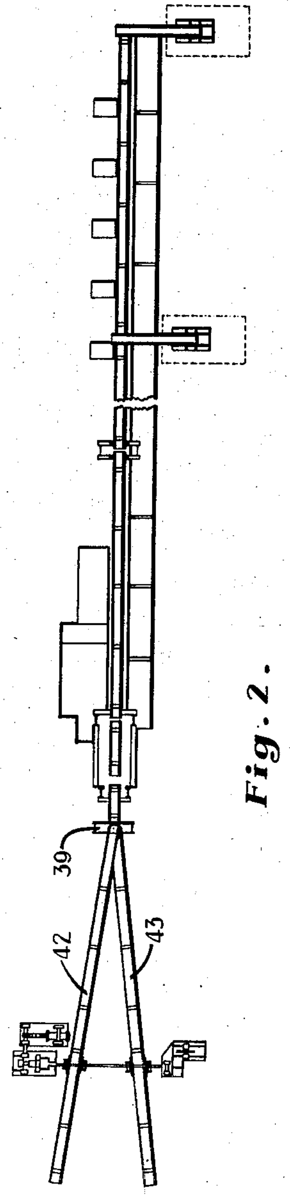
Fig. 2.
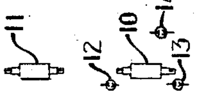
INVENTOR.
C. Walter Holmquist
BY Hooper, Leonard & Buell
his attorneys June 28, 1960 C. W. HOLMQUIST 2,942,505

HORIZONTALLY MOVABLE FEED TABLE

Filed Dec. 23, 1953 11 Sheets-Sheet 2

INVENTOR.
C. Walter Holmquist
BY Hooper, Leonard & Buell
his attorneys

June 28, 1960 C. W. HOLMQUIST 2,942,505

HORIZONTALLY MOVABLE FEED TABLE

Filed Dec. 23, 1953 11 Sheets-Sheet 3

INVENTOR.
C. Walter Holmquist
BY Hoopes, Leonard & Buell
his attorneys

INVENTOR.
C. Walter Holmquist
BY Hopper, Leonard & Buell
his attorneys

June 28, 1960 C. W. HOLMQUIST 2,942,505

HORIZONTALLY MOVABLE FEED TABLE

Filed Dec. 23, 1953 11 Sheets-Sheet 5

INVENTOR.
C. Walter Holmquist
BY Hooper, Leonard & Buell
his attorneys

INVENTOR.
C. Walter Holmquist
BY Hopkins Leonard & Buell
his attorneys

June 28, 1960 C. W. HOLMQUIST 2,942,505

HORIZONTALLY MOVABLE FEED TABLE

Filed Dec. 23, 1953 11 Sheets-Sheet 7

INVENTOR.
C. Walter Holmquist
BY Hopper, Leonard & Buell
his attorneys

June 28, 1960 C. W. HOLMQUIST 2,942,505

HORIZONTALLY MOVABLE FEED TABLE

Filed Dec. 23, 1953 11 Sheets-Sheet 8

INVENTOR.
C. Walter Holmquist
BY Hoopes, Leonard & Buell
his attorneys

June 28, 1960 C. W. HOLMQUIST 2,942,505

HORIZONTALLY MOVABLE FEED TABLE

Filed Dec. 23, 1953 11 Sheets-Sheet 9

INVENTOR.
C. Walter Holmquist
BY Hopes, Leonard & Buell
his attorneys

June 28, 1960 C. W. HOLMQUIST 2,942,505

HORIZONTALLY MOVABLE FEED TABLE

Filed Dec. 23, 1953

11 Sheets-Sheet 10

INVENTOR.
C. Walter Holmquist
BY Hoopes, Leonard & Buell
his attorneys

June 28, 1960 C. W. HOLMQUIST 2,942,505

HORIZONTALLY MOVABLE FEED TABLE

Filed Dec. 23, 1953 11 Sheets-Sheet 11

INVENTOR.
C. Walter Holmquist
BY Hooper, Leonard & Buell
his attorneys

United States Patent Office 2,942,505
Patented June 28, 1960

2,942,505

HORIZONTALLY MOVABLE FEED TABLE

C. Walter Holmquist, Warren, Ohio, assignor to Copperweld Steel Company, Warren, Ohio, a corporation of Pennsylvania Filed Dec. 23, 1953, Ser. No. 410,578

15 Claims. (Cl. 80—46)

This invention relates to improvements in rolling and particularly to improvements in the rolling of bar stock such as in the well-known Belgian-type and similar mills. In the operation of Belgian-type and similar mills it has been the practice to have men turn the bars and enter them into the next succeeding passes of the mill where repeaters are impractical because of size. Various types of chutes, skew tables, and transfers have been proposed to do this job but in every case heretofore proposed at least one man was necessary at each stand of the mill in order to supervise and control the operation of these accessories and to turn the bar for entry into the pass.

I have devised an improvement in rolling in Belgian-type mills which, in a preferred embodiment, provides means for receiving the bar from the roll stand, means for withdrawing the bar after it leaves the mill rolls, means to rotate the bar into proper position to enter the next pass, means to return the bar to the next pass and simultaneously to present a new receiver to the first pass. Preferably these operations are carried out by pneumatic cylinders and motors controlled by photoelectric cells or flag switches. Preferably the means for withdrawing the bar after it leaves the mill rolls is a pinch roll provided on a run-out table. A twister is preferably provided on the run-out table to rotate the bar into proper position to enter the next pass. The means to return the bar to the next pass is preferably a movable chute and a pinch roll controlled by photoelectric cells.

In a preferred embodiment, a hot bar entering a roll stand passes a photocell or, as it is commonly called, "an electric eye" on the entry side of the roll stand. The bar leaving the mill stand passes a second electric eye on the delivery side of the roll stand and enters an inclined swinging chute which carries it into a fixed run-out table provided with pinch rolls and a twister mechanism. As the hot bar leaves the mill roll stand the electric eye on the side starts the pinch roll at the beginning of the run-out table. The bar is driven up the swinging chute through the pinch roll and twister by the mill rolls, and passes a third electric eye. The eye sets up a circuit to close the pinch roll at the run-out table on the bar. As the tail of the bar passes the electric eye on the entry side of the mill stand it operates the twister and starts a timer which permits the pinch roll to close on the bar after it has been turned by the twister. The pinch roll then carries the bar from the mill stand up the chute and onto the run-out table. As the tail of the hot bar leaves the mill stand and goes up the chute past the electric eye at the delivery end of the mill stand the pinch roll is stopped. The chute then swings over to the next mill stand and a limit switch reverses the direction of rotation of the pinch roll at the beginning of the run-out table and drives the bar back down the chute which has been swung to the next mill stand, past an electric eye and into a second pinch roll preceding the next mill stand. When the end of the hot bar passes this fourth electric eye the second pinch roll is closed. When the tail of the hot bar passes the third electric eye the upper pinch roll is opened and stopped and the twister is returned to normal position. The second pinch roll carries the hot bar into the next mill stand from whence it is carried into a new trough and run-out table preparatory to entering a next succeeding mill stand until the number of passes required has been completed. When the chute swings toward the second mill stand a second chute moves from the second mill stand to the delivery end of the first mill stand to receive the next bar which is carried upwardly to a second deck on the run-out table. The chutes are interconnected so that one will not swing until the other is prepared to swing and has discharged or received the end of a bar therein as the case may be. This unique feature permits rolling bar stock in each stand simultaneously instead of being required to wait clearing the table before entering the next and to perform all the related operations automatically.

Other details, objects and advantages of the invention will become apparent as a following description of a present preferred embodiment thereof and a present preferred method of practicing the invention proceeds.

In the accompanying drawings I have shown a present preferred embodiment of the invention in which Figure 1 is a side elevation of the apparatus of my invention;

Figure 2 is a top plan view of the apparatus according to my invention as shown in Figure 1;

Figure 3:
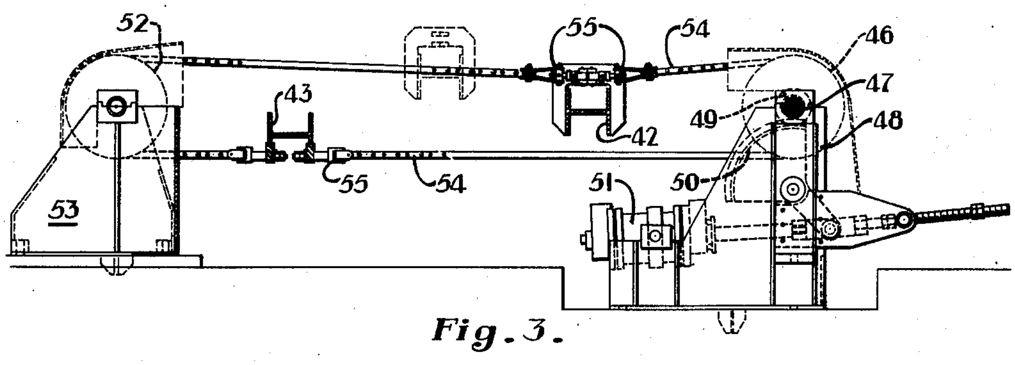
Figure 3 is an enlarged section through the movable trough at the chain drive which moves the ends of the movable chutes.

Referring to the drawings I have illustrated an apparatus for receiving bars from a roll stand 10 and delivering them to a different roll stand 11, simultaneously presenting a new receiving device at roll stand 10. An electric eye 12 is provided on the entry side of the roll stand 10 and another electric eye 13 is provided at the delivery side of the roll stand. The function of these two electric eyes will be described in detail hereinafter. Spaced from the roll stands 10 and 11 on a line substantially midway between them is provided a pair of superimposed fixed troughs 14 (lower) and 15 (upper) inclined upwardly from the horizontal. Each of these troughs is provided at the end nearest the roll stands with a pair of pinch rolls 16 (shown in detail in Figures 10–13). Each of the pinch rolls 16 is mounted on a shaft 17 journaled for rotation in a sleeve 18. The sleeve 18 is in turn mounted on a pair of spaced arms 19, the ends of which are rotatable on a shaft 20 beneath the trough. One of the arms 19 (preferably the upper) of each sleeve 18 is connected by a link 21 to one end of a rocker arm 22. The opposite end of each rocker arm is connected to the open end of a scissor link 23 connected to a pneumatic piston 24. Actuating the piston 24 opens and closes the scissor link 23 and in turn brings the rolls 16 closer together or farther apart. A clutch sleeve 25 carrying a clutch plate 25a on the lower end thereof is mounted on the lower end of one of the shafts 17 and is freely rotatable thereon. A gear 26 is fixed to sleeve 25 in engagement with a pinion gear 27 driven by a motor 28 through a right angle reduction drive 29 of conventional design. A clutch plate 30 is splined to the shaft 17 below the clutch sleeve 25 and is movable on the shaft in the vertical direction. A yoke 31 mounted on one end of a rocker arm 32 engages a groove 33 in the clutch plate 30. The opposite end of the rocker arm 32 is connected to a pneumatic cylinder 34 mounted on the frame beneath the shaft 17. Movement of the rocker arm 32 by the cylinder engages and disengages the clutch plate 30 with the clutch sleeve 25 thereby driving or releasing the shaft 17 and pinch roll 16. An overrunning clutch is provided which drives the stock toward the mill when the motor on pinch roll is so rotating. The overrunning clutch permits the bar to be drawn into the mill without affecting the pinch roll drive. The jaw clutch plate so engaged makes it possible to drive the pinch roll when the motor is reversed. A twister 35 of conventional design, and therefore not illustrated in detail, is mounted on one side of each trough for rotating or twisting a bar entering the trough. Rollers 36 in the bottom of each trough carry the bar in its passage in the troughs. Each trough is also provided with a louvred cover 37 to enclose the bar therein and an electric eye 38 adjacent the pinch rolls, the function of which will be later described.

An inverted U-shaped frame 39 adjacent the forward end of the troughs 14 and 15 is provided with upper 40 and lower 41 gimbal rings which support the upper ends of two swinging chutes 42 and 43 which discharge into troughs 14 and 15 previously described. Each of the chutes 42 and 43 is provided with bottom rollers 44 and side rollers 45 against which bear bars passing through the chutes.

Intermediate the ends of chutes 42 and 43 there is provided at one side of the chutes a drive sprocket 46 mounted on a horizontal shaft 47. The horizontal shaft 47 is in turn journaled for rotation on standards 48 and is provided with a pinion gear 49. The pinion 49 is in driving engagement with a segmental gear 50 operated by a hydraulic cylinder 51. On the opposite side of the chutes an idler sprocket 52 is journaled for rotation on standard 53. Sprocket chains 54 passing over the drive sprocket 46 and idler sprocket 52 are connected at their ends to clevis members 55 attached to each of the chutes 42 and 43. Movement of the drive sprocket 46 causes the two chutes to move in opposite directions so that as one approaches the drive sprocket 46 the other approaches the idler sprocket 52.

An eccentric cam 56 is mounted on an extension of the sprocket shaft 47 and is rotated thereby in standards 57 adjacent the standards 48 supporting the drive sprocket 49. An eccentric drive arm 58 is mounted on the eccentric cam 56 and is raised and lowered reciprocally by the rotation of the cam 56. The upper and free end of the drive arm 58 is connected to an arm 59 fixed on a shaft 60 journaled for rotation on the top of the standards 57. A bell crank is fixed to the shaft 60 and to the arm 59 to be driven thereby. One arm 61 of the bell crank is connected to one end of a lifting link 62. The opposite end of the lifting link 62 is connected to one end of a vertically movable support rail 63 transverse to the chutes and movable vertically in guide frames 64. The opposite arm 64 of the bell crank is attached to a connecting rod 65 and to the arm of a balancing air cylinder 66. The connecting rod 65 extends parallel to the support rail 63 above and transverse to the movable chutes. The connecting rod 65 is attached to one arm 67 of a second bell crank journaled for rotation on the top of vertical guide frames 68 adjacent the idler sprocket 52. The other arm 69 is connected to a lifting link 70 which in turn connects to the support rail 63 to raise and lower it in the guide frames 68. A pair of retaining blocks 71 are welded to the support rail on either side of the guide frames 68 to prevent endwise movement of the support rail as it is raised and lowered in the guide frame. A second support rail 72 is fixed to the guide frames 64 and 68 parallel to the movable support rail 63 and below it. The lower chute 43 is mounted on a movable cage 73 provided with upper 74 and lower 75 rollers which run on the top and bottom edge respectively of the support rail thereby guiding and supporting the chute through the arc of its swing from one roll stand to another. Similarly the upper chute 42 is suspended from a movable cage 76 having upper 77 and lower 78 rollers which engage the top and bottom edges of support rail 63. Each of the movable cages 73 and 76 are attached to the respective chutes 43 and 42 by pins 79 which engage elongated slots 80 so as to permit the angular position of the chute to change with respect to the cage as the chute traverses its swing. Similarly the upper and lower edges of the movable support rail 63 are provided with a radius to prevent binding when the chute and rail are raised and lowered.

Figure 4:
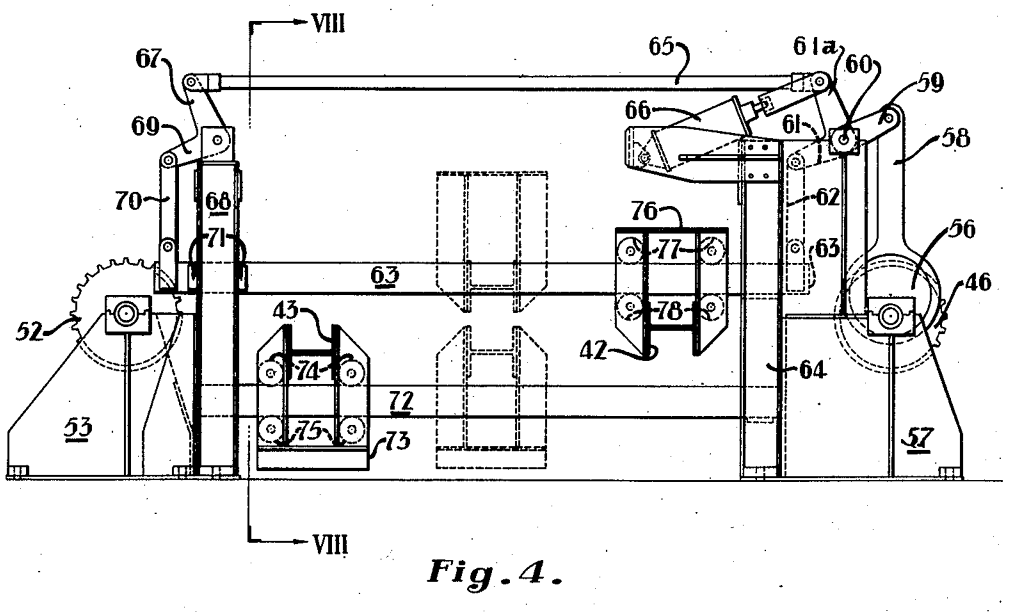
Figure 4 is an enlarged section through the troughs at the trough-supporting means.
Figure 5:
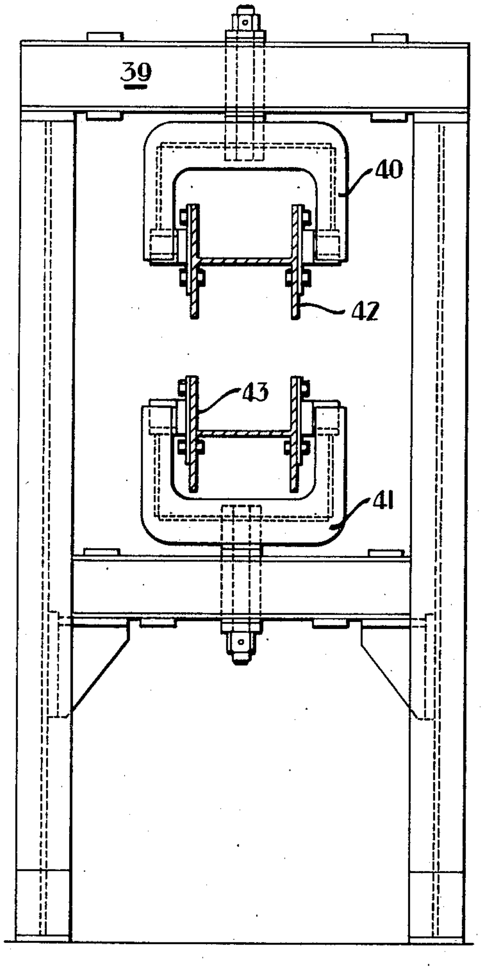
Figure 5 is an enlarged section through the movable troughs at the gimbal rings.
Figure 7:
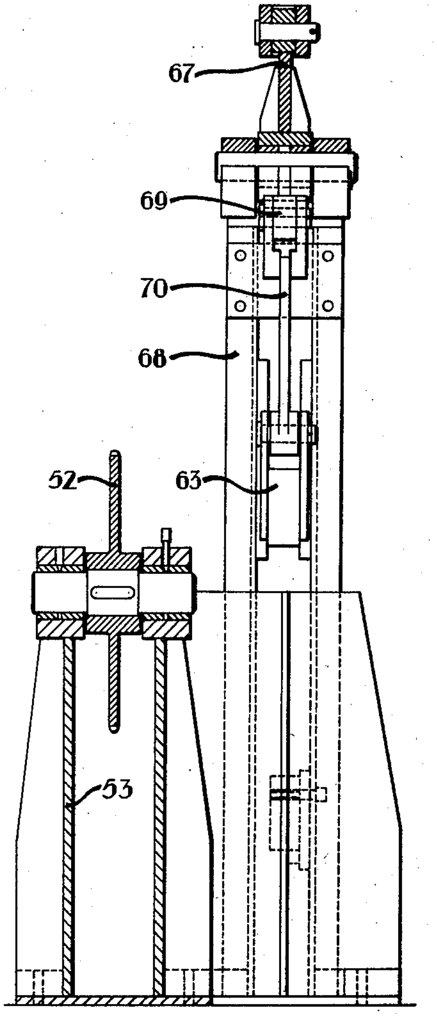
Figure 7 is an enlarged section through the left side sprocket and trough-balancing mechanism of Figure 4.
Figure 6:
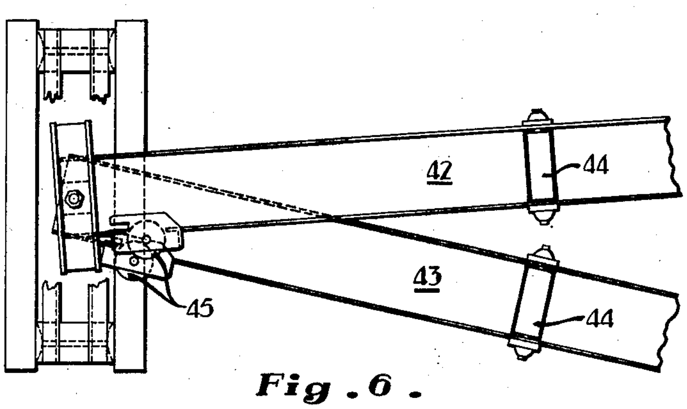
Figure 6 is a fragmentary enlarged plan view of the gimbal end of the movable chutes.
Figure 14:
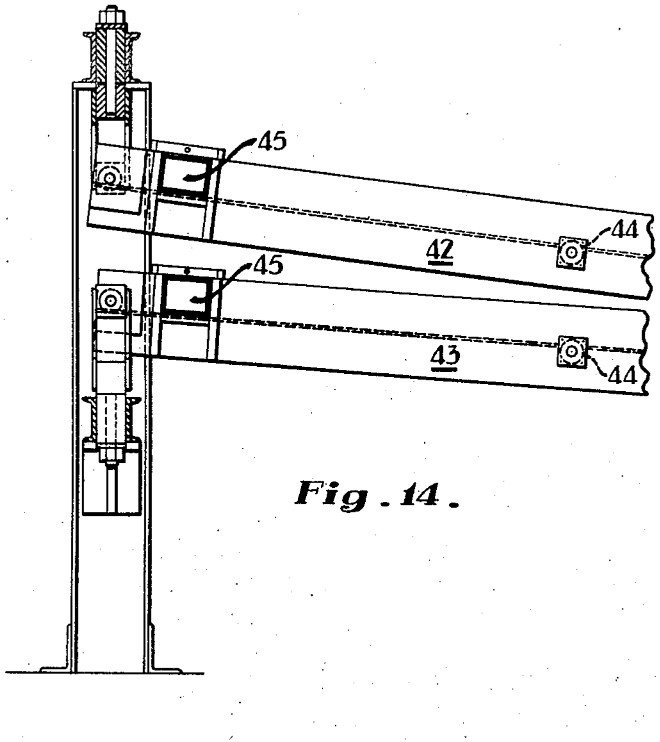
Figure 14 is a side elevation of the movable troughs at the gimbal as shown in Figure 6 with the side frame cut away.
Figure 8:
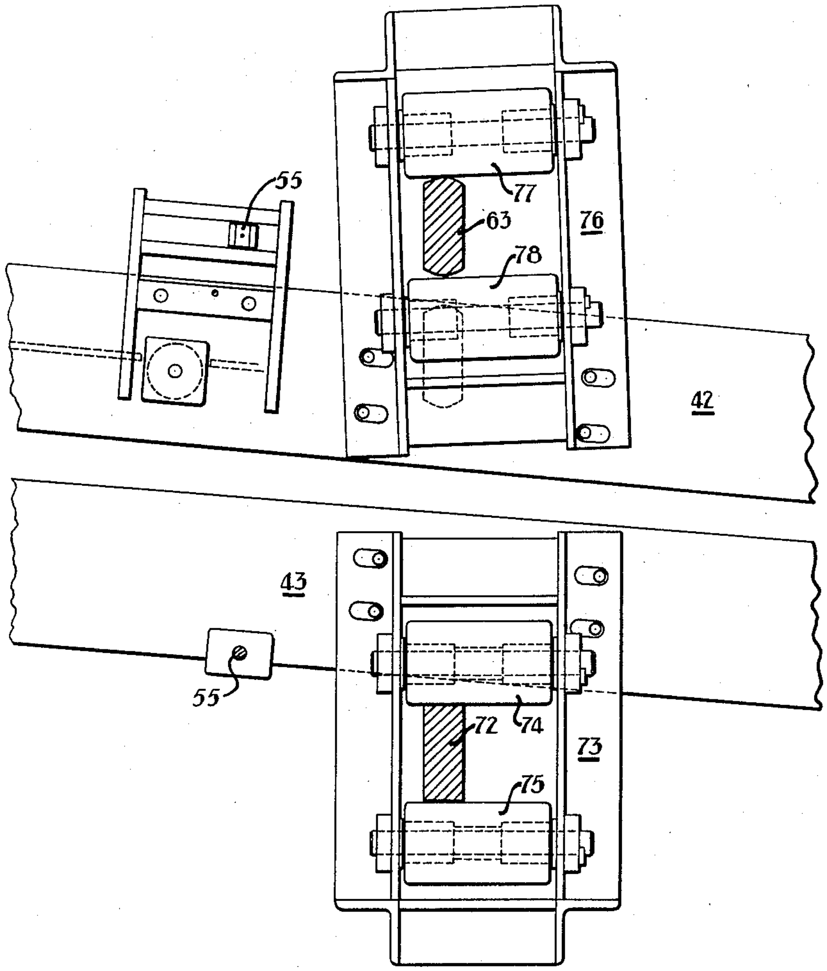
Figure 8 is a section on the line VIII—VIII of Figure 4.
Figure 9:
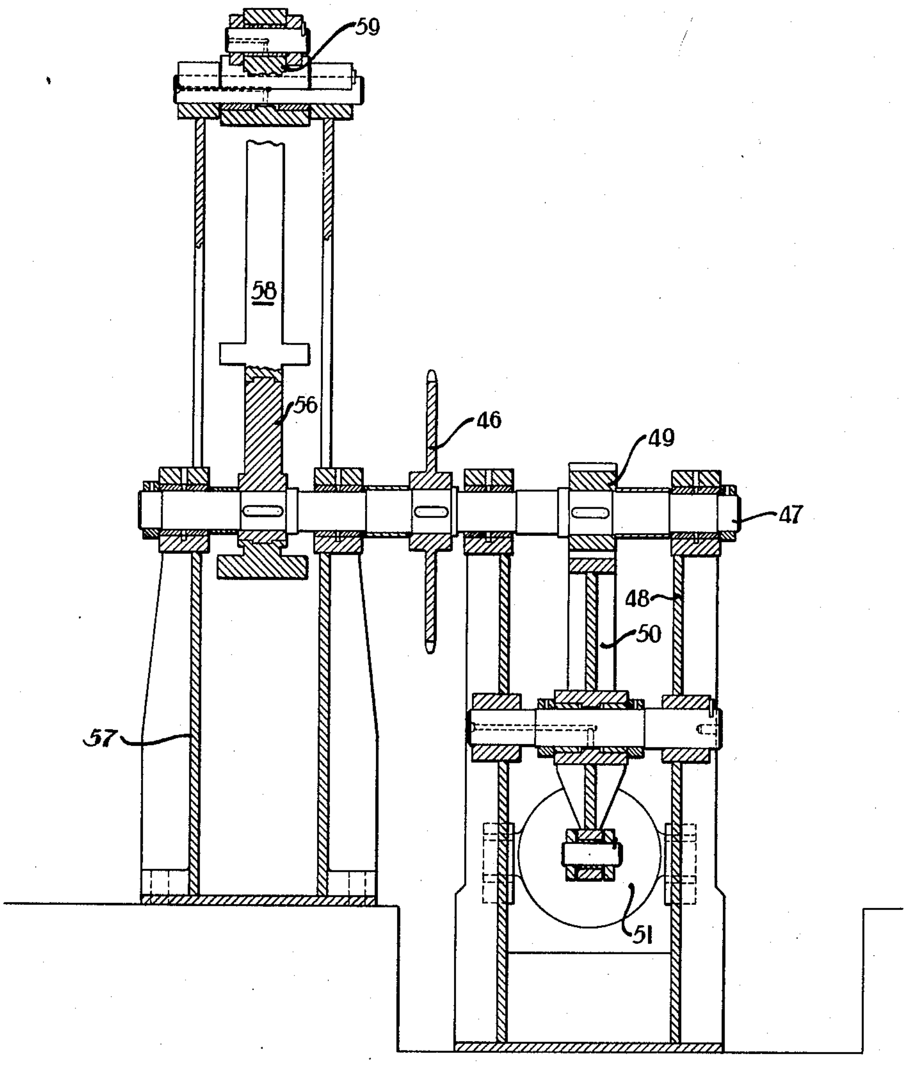
Figure 9 is an enlarged section through the right side sprocket, trough-balancing mechanism and drive therefor of Figure 4.
Figure 10:
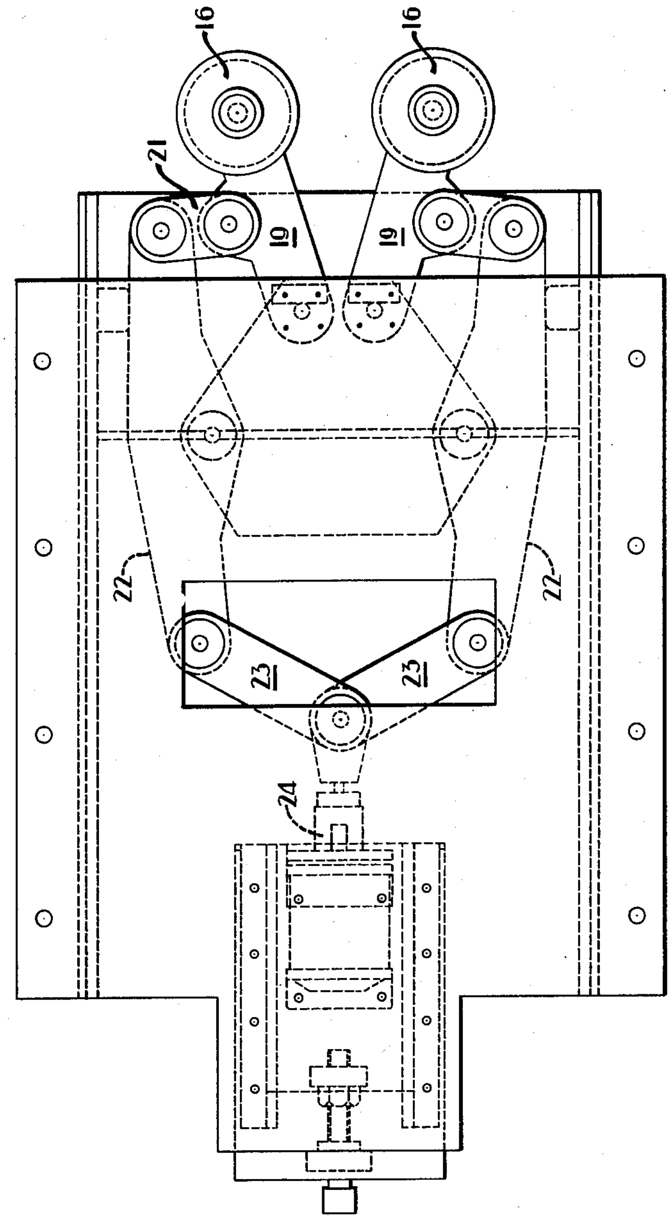
Figure 10 is a top plan view of the pinch roll arrangement at the lower trough of Figure 1.
Figure 11:
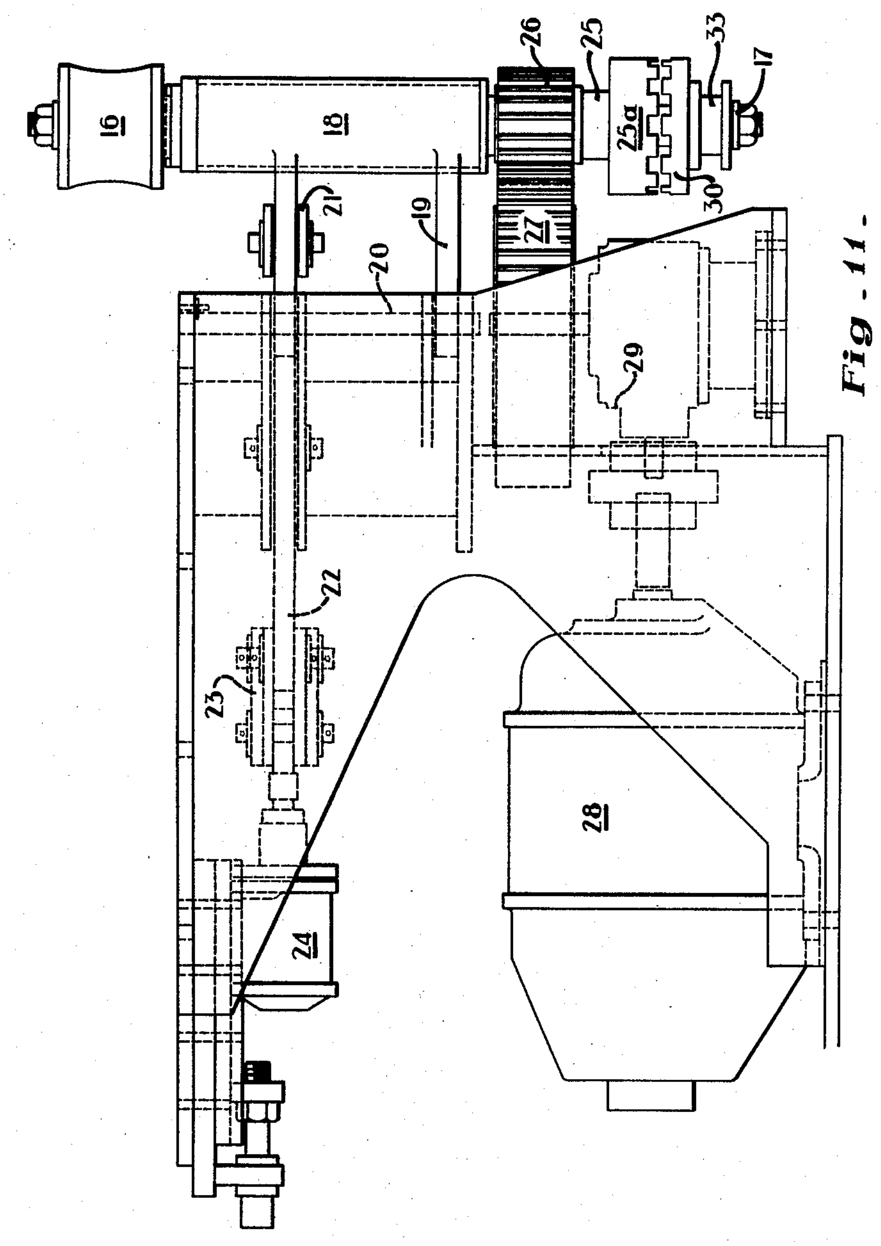
Figure 11 is a side elevation of the pinch roll arrangement of Figure 10.
Figure 12:
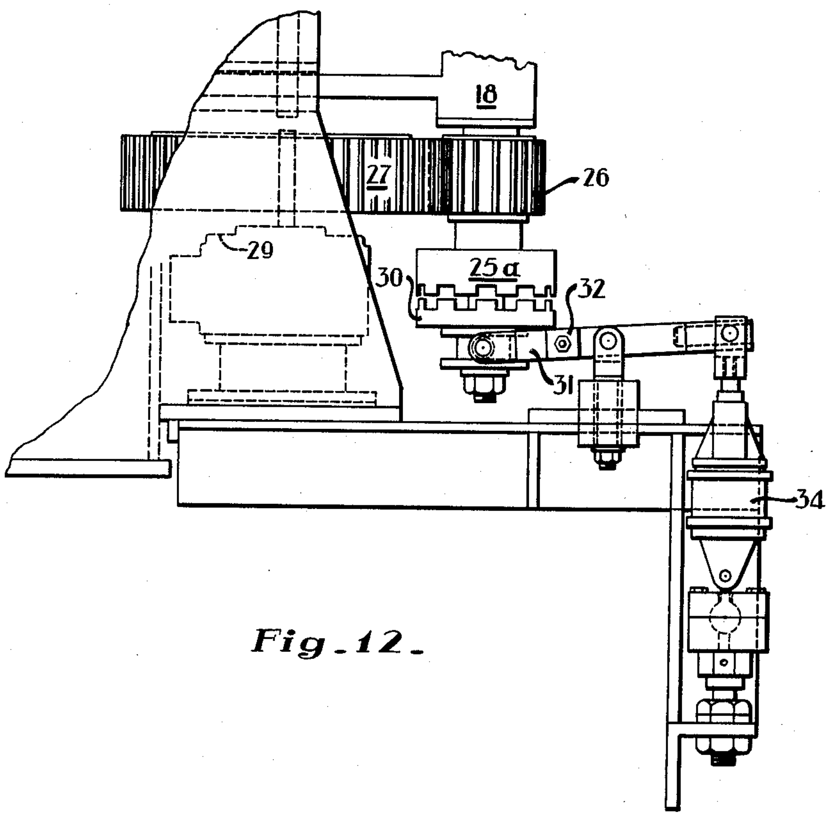
Figure 12 is a side elevation of the clutch-actuating mechanism for the pinch rolls of Figures 10 and 11.
Figure 13:
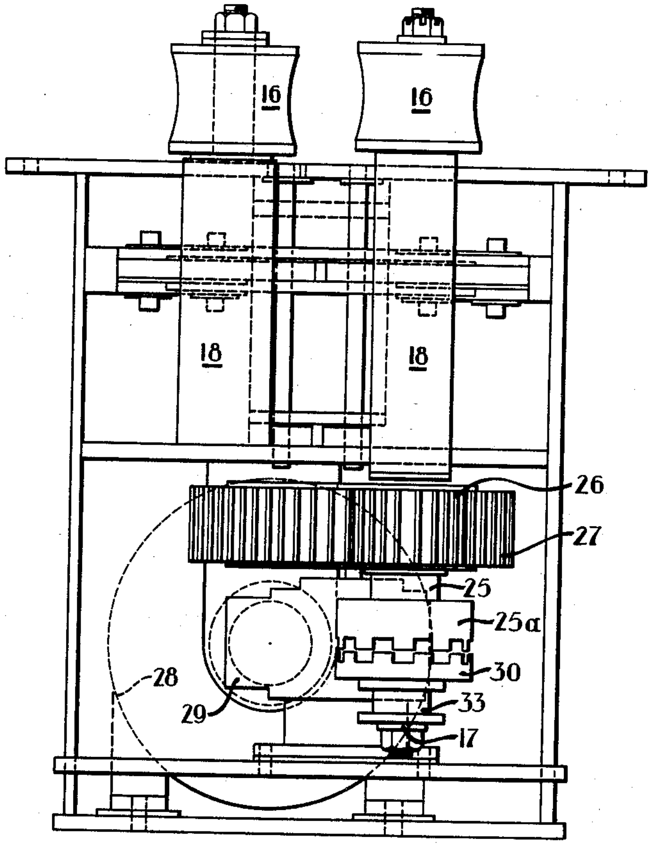
Figure 13 is a front elevation of the pinch rolls of Figure 10.
Figure 15:
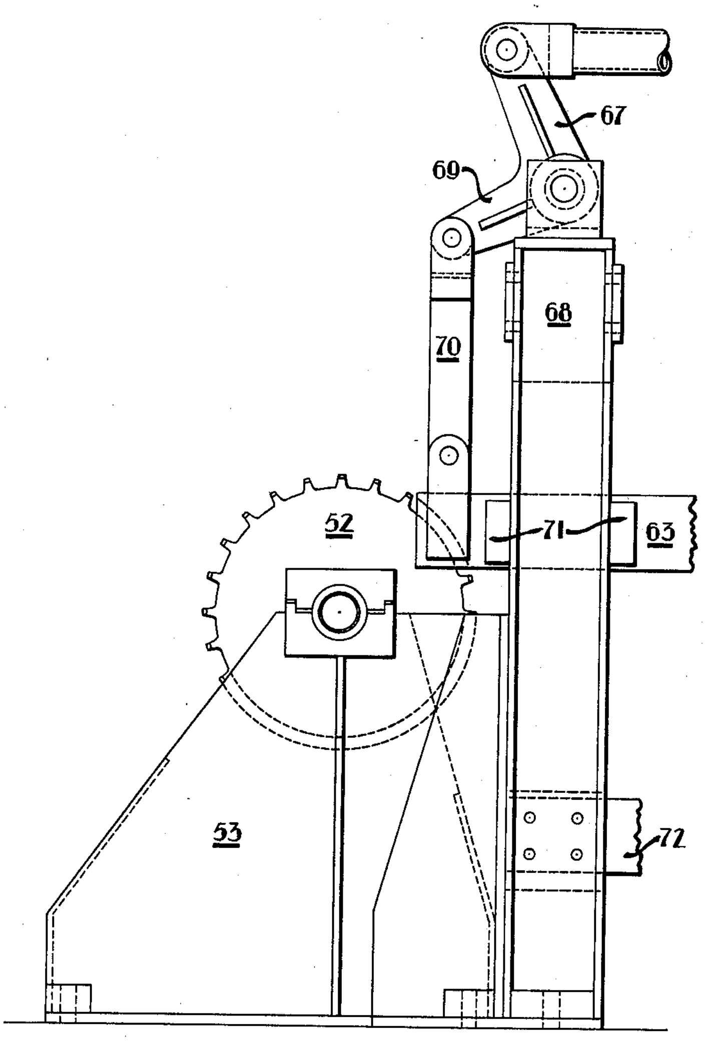
Figure 15 is an enlarged side elevation of the sprocket and guide frame arrangement of Figure 7.

The operation of the structure described above is as follows:

A hot bar passing through the roll stand 10 passes the electric eye 12 on the entry side of the roll stand and the electric eye 13 on the delivery side of the roll stand. As the bar passes the electric eye 13 on the delivery side of the roll stand the pinch roll drive motor 28 is energized to rotate the pinch rolls 16. The bar after passing the electric eye 14 enters one of the swinging chutes 42 or 43 as the case may be, and passes up the chute past an electric eye 38 adjacent the pinch roll, through the pinch rolls and past the twister 35 into the fixed troughs 14 or 15, as the case may be. As the tail of the bar 12 passes the electric eye 13 at the entry side of the stand 10 the twister is actuated by a circuit from the electric eye 13, after a time delay sufficient to clear the bar from the delivery guides on stand 10. At the same time the electric eye actuates a timed delay timer which closes the pinch roll on the bar after it has been turned up by the twister. The pinch roll which was already running, having been actuated by the electric eye 13 at the delivery side of the roll stand 10 drives the bar up the chute into the fixed trough. As the tail of the hot bar leaves roll stand 10 and goes up the chute passing electric eye 13 at the delivery side of the roll stand the pinch roll rotation is stopped with the tail of the hot bar in the swinging chute 14 or 15, as the case may be. At the same time electric eye 13 actuates the hydraulic cylinder 51 on the sprocket drive shaft thereby carrying the receiving end of the swinging chute from roll stand 10 to roll stand 11. At the same time the other swinging chute is brought into position in front of roll stand 10 to receive the next bar passing through the roll stand. In moving from its position at roll stand 10 the moving chute, assuming it to be the upper chute 42, is drawn by the sprocket chain 54 along the support rail 63. At the same time the support rail 63 is raised in the guide frames 64 and 68 by the action of the bell cranks at either side of the guide frames 64 and 68 as illustrated particularly in Figure 4. The lower chute 43 is thereupon drawn along the lower support rail so that it passes beneath the upper chute midway between the guide frames 64 and 68. As the upper chute 42 continues beyond the lower chute and has passed beyond it, the upper support rail 63 is gradually lowered by the action of the bell crank so that when the upper movable chute reaches the end of its travel it has dropped down into position before the entry end of roll stand 11. When this swing has been completed, a limit switch actuated by the moving chute starts the pinch roll 16 in the down direction so that the bar in the fixed trough and in the movable chute is discharged downwardly through the movable chute and into roll stand 11. At the same time a bar can pass into roll stand 10 and into the opposite movable chute to begin the cycle again. When the tail of the bar in the fixed trough has passed electric eye 38 the pinch roll 16 is opened and stopped and the twister is returned to its normal position. When the bar has passed out of the movable chute into roll stand 11, an electric eye at the entry side of the roll stand 11 releases the movable chute which has just delivered the bar so that it is free to return to the delivery side of roll stand 10 as soon as a bar passing through roll stand 10 has cleared electric eye 13 on the delivery side of roll stand 10. At that time the chutes are again carried through their swinging arc to exchange the position of the free end of the chutes from one roll stand to the other.

The wiring circuits which control the movement of the various items described above have not been illustrated since they are of conventional form and will be readily apparent from the structure of the apparatus.

While I have illustrated a present preferred embodiment of my invention it will be understood that it may be otherwise embodied within the scope of the following claims.

I claim:

1. A mechanism for transferring material from one roll stand to a second roll stand spaced from and in generally side-by-side relation to the first roll stand comprising movable means receiving the material from the delivery end of the first roll stand and delivering it to a run-out table, means carrying one end of the movable means from the delivery end of the first roll stand to the entry side of the second roll stand about a pivot point adjacent the run-out table and means returning the material from the run-out table through the movable means to the entry side of the second roll stand.

2. A mechanism for transferring material from one roll stand to a second roll stand spaced from and in generally side-by-side relation to the first roll stand comprising movable means receiving the material from the delivery end of the first roll stand and delivering it to a run-out table, means actuated by the end of the material leaving the first roll stand carrying one end of the movable means from the delivery end of the first roll stand to the entry side of the second roll stand about a pivot point adjacent the run-out table and means returning the material from the run-out table through the movable means to the entry side of the second roll stand.

3. A mechanism for transferring material from one roll stand to a second roll stand spaced from and in generally side-by-side relation to the first roll stand comprising chute means pivoted at the upper end thereof, said chute means receiving the material from the delivery end of the first roll stand and delivering it at the upper end to a run-out table, means carrying the lower end of the chute means from the delivery end of the first roll stand to the entry side of the second roll stand about the pivot point, and means returning the material from the run-out table through the movable chute means to the entry side of the second roll stand.

4. A mechanism for transferring material from one roll stand to a second roll stand spaced from and in generally side-by-side relation to the first roll stand comprising chute means pivoted at the upper end thereof, said chute means receiving the material from the delivery end of the first roll stand and delivering it at the upper end to a run-out table, means carrying the lower end of the chute means from the delivery end of the first roll stand to the entry side of the second roll stand about the pivot point and pinch rolls in the run-out table receiving the material from the chute at the delivery side of the first roll stand and returning the material through the chute means to the entry side of the second roll stand.

5. A mechanism for transferring material from one roll stand to a second roll stand spaced from and in generally side-by-side relation to the first roll stand comprising a run-out table spaced from and intermediate the two roll stands, movable means receiving the material from the delivery end of the first roll stand and delivering it to the run-out table, means carrying one end of the movable means from the delivery end of the first roll stand to the entry side of the second roll sand about a pivot point adjacent the run-out table and means returning the material from the run-out table through the movable means to the entry side of the second roll stand.

6. A mechanism for transferring material from one roll stand to a second roll stand spaced from and in generally side-by-side relation to the first roll stand comprising a run-out table spaced from and intermediate the two roll stands, movable means receiving the material from the delivery end of the first roll stand and delivering it to the run-out table, means actuated by the end of the material leaving the first roll stand carrying one end of the movable means from the delivery end of the first roll stand to the entry side of the second roll stand about a pivot point adjacent the run-out table and means returning the material from the run-out table through the movable means to the entry side of the second roll stand.

7. A mechanism for transferring material from one roll stand to a second roll stand spaced from and in generally side-by-side relation to the first roll stand comprising a run-out table spaced from and intermediate the two roll stands, chute means pivoted at the upper end thereof, said chute means receiving the material from the delivery end of the first roll stand and delivering it at the upper end to a run-out table, means carrying the lower end of the chute means from the delivery end of the first roll stand to the entry side of said second roll stand about the pivot point, and means returning the material from the run-out table through the movable chute means to the entry side of the second roll stand.

8. A mechanism for transferring material from one roll stand to a second roll stand spaced from and in generally side-by-side relation to the first roll stand comprising a run-out table spaced from and intermediate the two roll stands, chute means pivoted at the upper end thereof, said chute means receiving the material from the delivery end of the first roll stand and delivering it at the upper end to a run-out table, means carrying the lower end of the chute means from the delivery end of the first roll stand to the entry side of the second roll stand about the pivot point and pinch rolls in the run-out table receiving the material from the chute at the delivery side of the first roll stand and returning the material through the chute means to the entry side of the second roll stand.

9. A mechanism for transferring material from one roll stand to a second roll stand spaced from and in generally side-by-side relation to the first roll stand comprising a pair of movable transfer means pivoted at one end of each about a common vertical line, a pair of run-out tables generally one above the other beginning adjacent the pivot of the two movable means and adapted to receive material therefrom, means carrying the ends of the two movable means opposite the pivot point one above the other from one roll stand to the other whereby when one end of one movable means is positioned to receive material from the delivery end of the first roll stand, the other movable means is positioned to deliver material from the run-out table to the second roll stand and means in each run-out table returning the material from the table through the movable means positioned at the entry side of the second roll stand.

10. A mechanism for transferring material from one roll stand to a second roll stand spaced from and in generally side-by-side relation to the first roll stand comprising a pair of movable transfer means pivoted at one end of each about a common vertical line, a pair of run-out tables generally one above the other beginning adjacent the pivot point of the two transfer means, each table being in register with one of the transfer means and adapted to receive material therefrom, means actuated by the end of the material leaving the first roll stand and carrying the ends of the two movable means opposite the pivot point one above the other from one roll stand to the opposite roll stand whereby when one end of one transfer means is positioned to receive material from the first roll stand, the other transfer means is positioned to deliver material from the run-out table to the second roll stand, and means in each run-out table returning the material from the table through the transfer means positioned at the entry side of the second roll stand.

11. A mechanism for transferring material from one roll stand to a second roll stand spaced from and in generally side-by-side relation to the first roll stand comprising a pair of transfer chutes pivoted at the upper end of each about a common vertical line, a pair of run-out tables generally one above the other beginning adjacent the pivot of the two transfer chutes, each table being in register with one of the transfer chutes and adapted to receive material therefrom, means simultaneously carrying the ends of the two transfer chutes opposite the pivot point one above the other from one roll stand to the other whereby when one transfer chute is positioned to receive material from the delivery end of the first roll stand, the other transfer chute is positioned to deliver material from the run-out table to the second roll stand and means in each run-out table alternately receiving the material from the transfer chute and carrying it onto the table when positioned at the first roll stand and returning the material through the chute when the transfer chute is positioned at the entry side of the second roll stand.

12. A mechanism for transferring material from one roll stand to a second roll stand spaced from and in generally side-by-side relation to the first roll stand comprising a pair of transfer chutes pivoted at the upper end thereof about a common vertical line, a pair of run-out tables generally one above the other beginning adjacent the pivot of the two transfer chutes, each table being in register with one of the transfer chutes and adapted to receive material therefrom, means simultaneously carrying the ends of the two transfer chutes opposite the pivot point one above the other from one roll stand to the other whereby when one transfer chute is positioned to receive material from the delivery end of the first roll stand, the other transfer chute is positioned to deliver material from the run-out table to the second roll stand and pinch rolls in each of the run-out tables receiving the material from the chute at the delivery side of the first roll stand and returning the material through the same chute when moved to the entry side of the second roll stand.

13. A mechanism for transferring material from one roll stand to a second roll stand spaced from and in generally side-by-side relation to the first roll stand comprising a pair of movable transfer chutes pivoted at one end of each around a common vertical line, a pair of runout tables generally one above the other beginning adjacent the pivot of the two transfer chutes and in register therewith to receive material therefrom, means carrying the ends of the two transfer chutes opposite the pivot point one above the other from one roll stand to the other whereby when one end of one transfer chute is positioned to receive material from the delivery end of the first roll stand, the other transfer chute is positioned to deliver material from the runout table to the second roll stand, means in each run-out alternately receiving the material from the corresponding transfer chute when positioned at the delivery end of the first roll stand and returning the material from the table through the transfer chute when positioned at the entry end of the second roll stand, and twister means in each run-out table acting on the material as it enters the run-out table turning the material prior to its return through the transfer chute to the entry side of the second roll stand.

14. A mechanism for transferring material from one roll stand to a second roll stand spaced from and in generally side-by-side relation to the first roll stand comprising an inclined transfer chute, gimbal ring means spaced from and intermediate the two roll stands pivotally carrying the upper end of said chute, track means spaced from the roll stands between the gimbal ring means and said stands, said track means slidably carrying the lower end of the chute, drive means moving the chute on the track means whereby the lower end of the chute is moved alternately from the delivery side of the first roll stand to the entry side of the second roll stand about the pivot in the gimbal ring, a run-out table beginning adjacent the gimbal ring receiving the material from the chute and means on the run-out table alternately carrying the material into the run-out table and returning the material through the chute to the second roll stand.

15. A mechanism for transferring material from one roll stand to a second roll stand spaced from and in generally side-by-side relation to the first roll stand comprising a pair of inclined transfer chutes, a pair of gimbal rings spaced from and intermediate the two roll stands pivotally carrying the upper end of each chute for pivotal movement about a common vertical line, track means spaced from the roll stands between the gimbal rings and the roll stands, said track means having upper and lower rails each slidably carrying one of the chutes, means raising and lowering the upper of said rails whereby the lower end of the chute carried thereon is raised, drive means moving the two chutes slidably on their respective rails when the upper rail is in the uppermost position whereby the lower end of each of the chutes is simultaneously carried from a position in front of one roll stand to a position in front of the other roll stand, a pair of run-out tables beginning adjacent the gimbal rings in register with the chutes receiving material from the chutes and means on each run-out table alternately carrying the material from the chute into the run-out table and returning the material through the chute to the second roll stand.

References Cited in the file of this patent

UNITED STATES PATENTS

| | | |
|---|---|---|
| 379,974 | Morgan | Mar. 27, 1888 |
| 698,570 | Slick | Apr. 29, 1902 |
| 879,131 | Gardner | Feb. 11, 1908 |
| 1,278,136 | George | Sept. 10, 1918 |
| 1,490,965 | Crosby | Apr. 22, 1924 |
| 1,697,757 | Dahlstrom | Jan. 1, 1929 |
| 2,370,984 | Morgan | Mar. 6, 1945 |
| 2,392,334 | Morgan | Jan. 8, 1946 |

UNITED STATES PATENT OFFICE

CERTIFICATE OF CORRECTION

Patent No. 2,942,505 June 28, 1960

C. Walter Holmquist

It is hereby certified that error appears in the printed specification of the above numbered patent requiring correction and that the said Letters Patent should read as corrected below.

Column 6, line 14, for "sand" read -- stand --.

Signed and sealed this 3rd day of January 1961.

(SEAL)
Attest:

KARL H. AXLINE
Attesting Officer

ROBERT C. WATSON
Commissioner of Patents